United States Patent
Nilsson et al.

(10) Patent No.: US 7,949,036 B2
(45) Date of Patent: May 24, 2011

(54) DETERMINING A DETECTION SIGNAL IN A SPREAD SPECTRUM COMMUNICATIONS SYSTEM

(75) Inventors: Johan Nilsson, Hollviken (SE); Bo Bernhardsson, Lund (SE); Bengt Lindoff, Bjarred (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 860 days.

(21) Appl. No.: 11/908,935

(22) PCT Filed: Mar. 7, 2006

(86) PCT No.: PCT/EP2006/002341
§ 371 (c)(1),
(2), (4) Date: Nov. 5, 2007

(87) PCT Pub. No.: WO2006/099973
PCT Pub. Date: Sep. 28, 2006

(65) Prior Publication Data
US 2008/0212654 A1  Sep. 4, 2008

(30) Foreign Application Priority Data
Mar. 21, 2005 (EP) .................................. 05388024

(51) Int. Cl.
*H04B 1/00* (2006.01)
(52) U.S. Cl. ........................................................ 375/147
(58) Field of Classification Search .................... 375/147
See application file for complete search history.

(56) References Cited

U.S. PATENT DOCUMENTS

| | | | |
|---|---|---|---|
| 6,661,833 B1 * | 12/2003 | Black et al. | 375/147 |
| 6,668,011 B1 | 12/2003 | Li et al. | |
| 7,295,597 B2 * | 11/2007 | Fitton et al. | 375/148 |
| 7,643,596 B2 * | 1/2010 | Ruprich et al. | 375/357 |

OTHER PUBLICATIONS

International Preliminary Report on Patentability Chapter I for PCT/EP2006/002341.*
"Chip (CDMA)", Wikipedia, The free Encyclopedia online http://en.wikipedia.org/wiki/OVSF#Orthogonal_variable_spreading_factor).*
"CDMA spectral efficiency", Wikipedia, The free Encyclopedia online http://en.wikipedia.org/wiki/CDMA_spectral_efficiency).*

* cited by examiner

*Primary Examiner* — David C. Payne
*Assistant Examiner* — Nader Bolourchi (57) ABSTRACT

Disclosed is a method of generating a detection signal for detecting energy in a spread-spectrum signal, comprising: de-spreading the spread-spectrum signal by applying a predetermined spreading code to obtain a sequence of de-spread signal symbols (202A-202D); accumulating a number of said signal symbols to obtain a single detection signal. The accumulation includes: obtaining a first and a second subset of said de-spread signal symbols, wherein the symbols of the first subset have values that are known to the receiver or at least known to be the same for all symbols of the first subset, and wherein the symbols of the second subset have unknown values; coherently accumulating the symbols of the first subset to obtain a first partial detection signal (203A, 203B, 203C); non-coherently accumulating the symbols of the second subset to obtain a second partial detection signal (204A, 204B, 204C); and combining the first and second partial detection signals to obtain the single detection signal (208).

22 Claims, 3 Drawing Sheets

DETERMINING A DETECTION SIGNAL IN A SPREAD SPECTRUM COMMUNICATIONS SYSTEM

This application claims the benefit of PCT Application PCT/EP2006/002341, filed Mar. 7, 2006, the disclosure of which is fully incorporated herein by reference.

TECHNICAL FIELD

This invention relates to the generation of a detection signal for detecting energy in a received spread spectrum communications signal.

BACKGROUND OF THE INVENTION

Code Division Multiple Access (CDMA) systems are spread spectrum systems in which different physical channels are separated by different spreading codes, the so-called channelization codes. Hence, the received signal is modulated by the data to be transmitted and by the channelization code. The data modulation is performed at a predetermined bit rate, and the modulation with the channelization code is performed at a higher rate, the so-called chip rate, as the bits of the spreading signal are referred to as chips. The spreading factor corresponds to the ratio of the data bit duration to the chip duration. Hence, the spreading factor determines the number of chips contained in one symbol.

In the wide-band code-division multiple access (WCDMA) system designed for 3GPP, the channelization codes are so-called orthogonal variable spreading factor (OVSF) codes. They are selected as to preserve orthogonality between different physical channels with different rates and spreading factors.

Furthermore, the downlink data in 3GPP WCDMA is further modulated according to a scrambling code, i.e. a spreading code specific for each cell, while the channelization code separates different physical channels within that cell. During an initial cell search procedure, the user terminal/receiver determines for all candidate scrambling codes whether there is significant signal energy correlated to a known channelization code. Hence, in a given cell, a CDMA receiver needs to determine the amount of signal energy correlated to one or more channelization codes of the received signal. Furthermore, the receiver needs to determine any frequency shifts and/or time delays of the received signal. Hence, the receiver performs a synchronisation in code space, in frequency space, and in time.

In order to perform the above synchronizations, a receiver in a WCDMA system needs to detect the presence of energy in a signal. In the 3GPP WCDMA, known pilot symbols are sent via a common pilot channel (CPICH) which is modulated with a known channelization code. Since the CPICH has a known channelization code and since the data sent via the CPICH is fixed and known to the receiver, the CPICH may be used in the cell search.

Similarly, in the path search and RAKE delay procedure, the synchronisation of the frequency and/or time requires a detection of peaks in the signal energy for different time/frequency delays.

Hence, in the above situations, the receiver determines a detection signal indicative of the energy in a de-spread signal in order to perform signal synchronisation in code space, frequency, and/or time. It is thus a general desire in WCDMA systems to increase the detection performance when determining the detection signal.

U.S. Pat. No. 5,691,974 describes a method for tracking the frequency and phase of a user channel in a spread spectrum system. According to this method, multiple spread spectrum communications signals are fed in parallel to respective data receivers where they are de-spread using respective preselected de-spreading codes at an adjustable phase angle and decoded over multiple orthogonal codes active within the communication system. Multiple decoded signals are then combined to form a single phase detection signal for use in a tracking loop. Even though this method improves the detection performance by using correlation of different channels, it remains a problem to further improve the detection performance.

SUMMARY OF THE INVENTION

The above and other problems are solved by a method of generating a detection signal for detecting energy in a spread spectrum communications signal received by a receiver, the method comprising:
  de-spreading a received spread spectrum communications signal by applying at least one predetermined spreading code from a set of spreading codes to obtain a sequence of de-spread signal symbols;
  accumulating a predetermined number of said de-spread signal symbols to obtain a single detection signal;
  wherein accumulating includes
    obtaining at least a first and a second subset of said de-spread signal symbols, wherein the de-spread signal symbols of the first subset have values that are either known to the receiver or at least known to be the same for all de-spread signal symbols of the first subset, and wherein the de-spread signal symbols of the second subset have values unknown to the receiver;
    coherently accumulating the de-spread signal symbols of the first subset to obtain a first partial detection signal;
    non-coherently accumulating the de-spread signal symbols of the second subset to obtain a second partial detection signal; and
    combining the first and second partial detection signals to obtain the single detection signal.

Hence, by selecting at least first and second subsets of known and unknown signal symbols, respectively, and by performing coherent correlation over the first subset of known symbols and non-coherent correlation over the second subset of unknown symbols, the correlation performance is further improved. When the signal symbols are known to the receiver, i.e. it is a priori known which symbols are transmitted over a given channel, coherent accumulation can be performed over a sequence of symbols, thereby improving the detection performance, since coherent accumulation provides an improved accumulation performance. Furthermore, by incorporating additional non-coherent accumulation over the unknown symbols (i.e. symbols whose values cannot be assumed to be known to the receiver prior to their decoding) of the second subset, the total accumulated signal energy is further increased, thereby further improving the detection performance.

The term detection signal refers to any signal suitable for the detection of energy in a received communication signal. Examples of detection signals are accumulated signal power or accumulated signal amplitudes. The accumulation may be performed over predetermined time intervals, e.g. as distinct, periodic intervals or as sliding windows.

The term coherent accumulation refers to the accumulation/summation of signal symbols and the subsequent calculation of the amplitude or power of the accumulated signal symbols. The accumulation of the signal is performed over a predetermined period of time.

The term non-coherent accumulation refers to the calculation of the signal amplitude or signal power for the individual components to be accumulated and the accumulation/summation of the calculated power/amplitude values. The inclusion of non-coherently accumulated signals in the calculation of the detection signal increases the amount of captured energy at little additional complexity and implementation cost.

The combination of coherent and non-coherent accumulation does not increase the processing time and is therefore suitable even for processes with strict real-time requirements.

At least one first subset of signal symbols is selected such that the values of the signal symbols of the first subset are known to the receiver. For example, the symbols sent via the CPICH are known. Hence, in some embodiments, the symbols of the CPICH are selected to be included in the first subset. Consequently, in these embodiments, the at least one predetermined spreading code includes a spreading code of a common pilot channel (CPICH), and the first subset of de-spread signal symbols comprises signal symbols received over the common pilot channel.

Likewise, some of the symbols sent over the dedicated physical channel (DPCH) are pilot symbols and known to the receiver. Consequently, in some embodiments the known symbols received on the DPCH are selected to be included in the first subset.

The receiver performs coherent accumulation over a number of de-spread symbols of the first subset. When the coherent accumulation is performed over a plurality of symbols, the amount of detected energy and, thus, the detection efficiency is increased. It is understood that, in some embodiments, the receiver may coherently accumulate symbols of more than one subset. The resulting accumulated signals may then be combined non-coherently to a single detection signal.

At least one second subset of signal symbols is selected such that the values of the signal symbols of the second subset are a priori unknown to the receiver. For example, WCDMA 3GPP systems include a Primary Common Control Physical Channel (P-CCPCH). The P-CCPCH has a fixed channelization code, but the data sent via the P-CCPCH is a priori unknown to the receiver. In some embodiments, the data symbols of the P-CCPCH are selected to be included in the second subset and non-coherently accumulated over a number of symbols. Hence, in these embodiments, the at least one predetermined spreading code includes a spreading code of a primary common control physical channel (P-CCPCH), and the second subset of de-spread signal symbols comprises signal symbols received over the primary common control physical channel (P-CCPCH). Consequently, the total accumulated signal energy is further increased, thereby improving the detection efficiency.

Like wise, some of the symbols sent over the DPCH are data symbols and as such a priori unknown to the receiver. Consequently, in some embodiments the unknown symbols received on the DPCH are selected to be included in the second subset and non-coherently accumulated. Accordingly, in some embodiments, the at least one predetermined spreading code includes a spreading code of a dedicated physical channel (DPCH); wherein the first subset of de-spread signal symbols comprises known signal symbols received over the dedicated physical channel; and the second subset of de-spread signal symbols comprises unknown signal symbols received over the dedicated physical channel.

It is understood that, in some embodiments, the receiver may non-coherently accumulate symbols of more than one subset. The resulting accumulated signals may then be combined non-coherently with each other and/or with the coherently accumulated signals of the first subset(s).

In some embodiments, de-spreading comprises de-spreading with at least a first and a second spreading code to obtain corresponding first and a second sequences of de-spread signal symbols; and wherein obtaining at least a first and a second subset of said de-spread signal symbols comprises obtaining each of the first and second subset from one of the first and second sequences. Hence, according to this embodiment, the received signal is de-spread by applying at least two different spreading codes. Each of the at least two de-spread signals is then accumulated and the resulting accumulated signals are combined to form the detection signal. Hence, different physical channels with different spreading codes are employed for the generation of the detection signal, thereby further increasing the accumulated signal energy.

According to a further embodiment, the first and second spreading codes have a first spreading factor; and the method comprises de-spreading the received spread spectrum communications signal by applying an auxiliary spreading code, the auxiliary spreading code having a second spreading factor equal to half the first spreading factor, to obtain a sequence of auxiliary de-spread signal symbols;

generating first and second sequences of de-spread signal symbols corresponding to respective ones of the first and second spreading codes by pairwise combining the auxiliary de-spread signal symbols.

Hence, the de-spreading with the first and second spreading codes is performed in a particularly efficient manner, by de-spreading with an auxiliary spreading code with half the spreading factor and by pairwise combining the resulting de-spread symbols to de-spread symbols corresponding to the first and second spreading codes.

In particular, in one embodiment, the first spreading code comprises a sequence of 2n identical values, n being a positive integer, while the second spreading code comprises a first part sequence of n identical values and a second part sequence of n identical values having an opposite sign than the values of the first part sequence; and wherein the auxiliary spreading code comprises a sequence of n identical values.

In yet another embodiment, combining the first and second partial detection signals comprises multiplying at least one of the first and second partial detection signals with a weighting factor. Hence, the different terms contributing to the single detection signal are weighted individually, thereby allowing to account for the amount of noise suppression that is achieved by the individual terms and thus an improved overall detection performance of the combined signal. In one embodiment, multiplying comprises multiplying at least one of the first and second partial detection signals with a weighting factor to obtain a maximum ratio combining of the first and second partial detection signals, thereby providing an improved combination of the different contributions to the detection signal.

According to yet another embodiment, the de-spread signal symbols of the first subset have a value that remains constant over a predetermined number of symbols; and coherently accumulating the de-spread signal symbols of the first subset comprises coherently accumulating the de-spread signal symbols of the first subset over said predetermined number of symbols. It has been realised that, in some situations, a coherent accumulation of the de-spread signal symbols is possible, even though the actual value of the de-spread signal symbols is unknown to the receiver, as long as the de-spread signal symbols are known not to vary over the accumulation interval. Hence, by performing coherent accumulation over de-spread signal symbols that are unknown but known to be constant over a certain period of time, the detection performance can be further improved. An example of a physical channel over which unknown data is sent, but where the symbols are known to be unchanged over certain time intervals is the page indicator channel (PICH) of 3GPP WCDMA. Hence, in some embodiments the at least one predetermined spreading code includes a spreading code of a page indicator channel (PICH), and wherein the first subset of de-spread signal symbols comprises signal symbols received over the page indicator channel.

Hence, for channels where the sent data is known, such as for the CPICH, coherent accumulation can be achieved over any data correlation length. For channels where the data is not known, such as for the P-CCPCH and/or PICH, coherent accumulation can be achieved over a correlation period during which it is known that the data is unchanged and non-coherent accumulation then be used over longer periods.

According to another aspect, the above and other problems are solved by a method of generating a detection signal for detecting energy in a received spread spectrum communications signal, the method comprising:
de-spreading a received spread spectrum communications signal by applying at least one predetermined spreading code from a set of spreading codes to obtain a sequence of de-spread signal symbols;
accumulating a predetermined number of said de-spread signal symbols to obtain a detection signal;
wherein the method further comprises
buffering at least one of the received spread spectrum signal and the sequence of de-spread signal symbols as a buffered signal;
decoding a predetermined block of the de-spread signal symbols to obtain a set of decoded data;
processing the decoded data to reconstruct a corresponding block of transmitted signal symbols;
generating a coherently accumulated detection signal from the buffered signal and the reconstructed transmitted signal symbols.

Consequently, coherent accumulation of the buffered signals is possible, even where the signal symbols are a priori unknown. In particular, since the received signal and/or the de-spread signal symbols are buffered while the receiver decodes the received signal and reconstructs the values of the transmitted signal symbols, the values of the signal symbols for the buffered signal are known.

When the method further comprises verifying the decoding step and performing the step of generating the coherently accumulated detection signal conditioned on a successful verification, the correctness of the decoded signal symbols is verified, e.g. by performing a cyclic redundancy check, thereby ensuring the correctness of the coherent accumulation based on the reconstructed signal symbols. Optionally both the step of processing the decoded data and the step of generating the coherently accumulated detection signal are conditioned on the successful verification.

According to yet another embodiment, the method comprises:
obtaining at least a first and a second subset of said de-spread signal symbols, wherein the de-spread signal symbols of the first subset have values that are either known to the receiver or at least known to be the same for all de-spread signal symbols of the first subset, and wherein the de-spread signal symbols of the second subset have values unknown to the receiver;
coherently accumulating the de-spread signal symbols of the first subset to obtain a first partial detection signal;
performing the steps of buffering, decoding, processing the decoded data, and generating a coherently accumulated detection signal with respect to the second subset of de-spread data symbols to obtain a second partial detection signal; and
combining the first and second partial detection signals to obtain a single detection signal.

Finally, the method according to the second aspect has further one or more embodiments corresponding to the embodiments described in connection with the first-mentioned method.

It is noted that the features of the methods described above and in the following may be implemented in software and carried out in a data processing system or other processing means caused by the execution of computer-executable instructions. Alternatively, the described features may be implemented by hardwired circuitry instead of software or in combination with software. The term processing means comprises any suitable general- or special-purpose programmable microprocessor, Digital Signal Processor (DSP), Application Specific Integrated Circuit (ASIC), Programmable Logic Array (PLA), Field Programmable Gate Array (FPGA), special purpose electronic circuits, etc., or a combination thereof.

Embodiments of the present invention can be implemented in different ways, including the methods described above and in the following and a receiver, each yielding one or more of the benefits and advantages described in connection with the first-mentioned methods, and each having one or more embodiments corresponding to the embodiments described in connection with the first-mentioned methods and disclosed in the dependent claims.

In particular, the invention further relates to a receiver for receiving a spread spectrum communications signal, the receiver comprising:
at least one de-spreader adapted to de-spread a received spread spectrum communications signal by applying at least one predetermined spreading code from a set of spreading codes to obtain a sequence of de-spread signal symbols;
at least one accumulator for accumulating a predetermined number of said de-spread signal symbols to obtain a single detection signal;
wherein the at least one accumulator includes
a coherent accumulator for coherently accumulating the de-spread signal symbols of at least a first subset of said de-spread signal symbols to obtain a first partial detection signal, wherein the de-spread signal symbols of the first subset have values that are either known to the receiver or at least known to be the same for all de-spread signal symbols of the first subset;
a non-coherent accumulator for non-coherently accumulating the de-spread signal symbols of at least a second subset of de-spread signal symbols having values unknown to the receiver to obtain a second partial detection signal; and
a combiner for combining the first and second partial detection signals to obtain the single detection signal.

According to one embodiment, the at least one de-spreader is adapted to de-spread the received spread spectrum communications signal with respective first and second spreading codes to obtain respective first and second sequences of de-spread signal symbols; and each of the first and second subsets of said de-spread signal symbols is a subset of a corresponding one of the first and second sequences of de-spread signal symbols.

According to a further embodiment, the first and second spreading codes have a first spreading factor; the de-spreader is adapted to de-spread the received spread spectrum communications signal by applying an auxiliary spreading code, the auxiliary spreading code having a second spreading factor equal to half the first spreading factor, to obtain a sequence of auxiliary de-spread signal symbols; and the receiver comprises at least one combiner adapted to generate first and second sequences of de-spread signal symbols corresponding to respective ones of the first and second spreading codes by pairwise combining the auxiliary de-spread signal symbols.

According to a further embodiment, the first spreading code comprises a sequence of 2n identical values, n being a positive integer, while the second spreading code comprises a first part sequence of n identical values and a second part sequence of n identical values having an opposite sign than the values of the first part sequence; and wherein the auxiliary spreading code comprises a sequence of n identical values.

According to another embodiment, the at least one predetermined spreading code includes a spreading code of a common pilot channel (CPICH), and the first subset of de-spread signal symbols comprises signal symbols received over the common pilot channel.

According to another embodiment, the at least one predetermined spreading code includes a spreading code of a primary common control physical channel (P-CCPCH), and the second subset of de-spread signal symbols comprises signal symbols received over the primary common control physical channel (P-CCPCH).

According to another embodiment, the at least one predetermined spreading code includes a spreading code of a dedicated physical channel (DPCH); the first subset of de-spread signal symbols comprises known signal symbols received over the dedicated physical channel; and the second subset of de-spread signal symbols comprises unknown signal symbols received over the dedicated physical channel.

According to another embodiment, the receiver further comprises at least one multiplier circuit for multiplying at least one of the first and second partial detection signals with a weighting factor.

According to another embodiment, the at least one multiplier circuit is adapted to multiply at least one of the first and second partial detection signals with a weighting factor to obtain a maximum ratio combining of the first and second partial detection signals.

According to another embodiment, the de-spread signal symbols of the first subset have a value that remains constant over a predetermined number of symbols; and the receiver comprises a control circuit for controlling the coherent accumulator to coherently accumulate the de-spread signal symbols of the first subset over said predetermined number of symbols.

According to another embodiment, the at least one predetermined spreading code includes a spreading code of a page indicator channel (PICH), and the first subset of de-spread signal symbols comprises signal symbols received over the page indicator channel.

According to another aspect, the invention further relates to a receiver for receiving a spread spectrum communications signal, the receiver comprising:

a de-spreader adapted to de-spread a received spread spectrum communications signal by applying at least one predetermined spreading code from a set of spreading codes to obtain a sequence of de-spread signal symbols;

at least one accumulator for accumulating a predetermined number of said de-spread signal symbols to obtain a detection signal;

a buffer for buffering at least one of the received spread spectrum signal and the sequence of de-spread signal symbols as a buffered signal;

a decoder for decoding a predetermined block of the de-spread signal symbols to obtain a set of decoded data;

processing means adapted to reconstruct a corresponding block of transmitted signal symbols from the decoded data;

wherein the accumulator is adapted to generate a coherently accumulated detection signal from the buffered signal and the reconstructed transmitted signal symbols.

The buffer may include any circuit or memory suitable for temporarily storing a sequence of chips or signal symbols.

According to one embodiment, the receiver further comprises processing means for verifying the decoding step and wherein the accumulator is adapted to perform the generation of the coherently accumulated detection signal conditioned on a successful verification. According to one embodiment, the processing means for verifying the decoding step is adapted to perform a cyclic redundancy check.

The receiver may be a receiver of a CDMA system, in particular a WCDMA system such as the WCDMA system defined for 3GPP. In particular, in one embodiment, the receiver is a user equipment (UE) such as a user terminal, and the communications signal is a WCDMA downlink signal that the user equipment receives from a corresponding base station. The term user equipment includes any portable radio communications equipment or other handheld or portable devices. The term portable radio communications equipment includes all equipment such as mobile telephones, pagers, communicators, i.e. electronic organizers, smart phones, personal digital assistants (PDAs), handheld computers, or the like. Alternatively, the receiver may be a base station, e.g. a Node B of a WCDMA network. Hence, the method described herein may be applied both to an uplink and a downlink channel.

In some embodiments the set of spreading codes is a set of orthogonal varying spreading factor codes. In some embodiments the set of spreading codes is a set of channelization codes of a telecommunications system. The communications system may be a CDMA system, in particular a WCDMA system.

BRIEF DESCRIPTION OF THE DRAWINGS

The invention will be explained more fully below in connection with embodiments and with reference to the drawings, in which.

DETAILED DESCRIPTION

Figure 1:
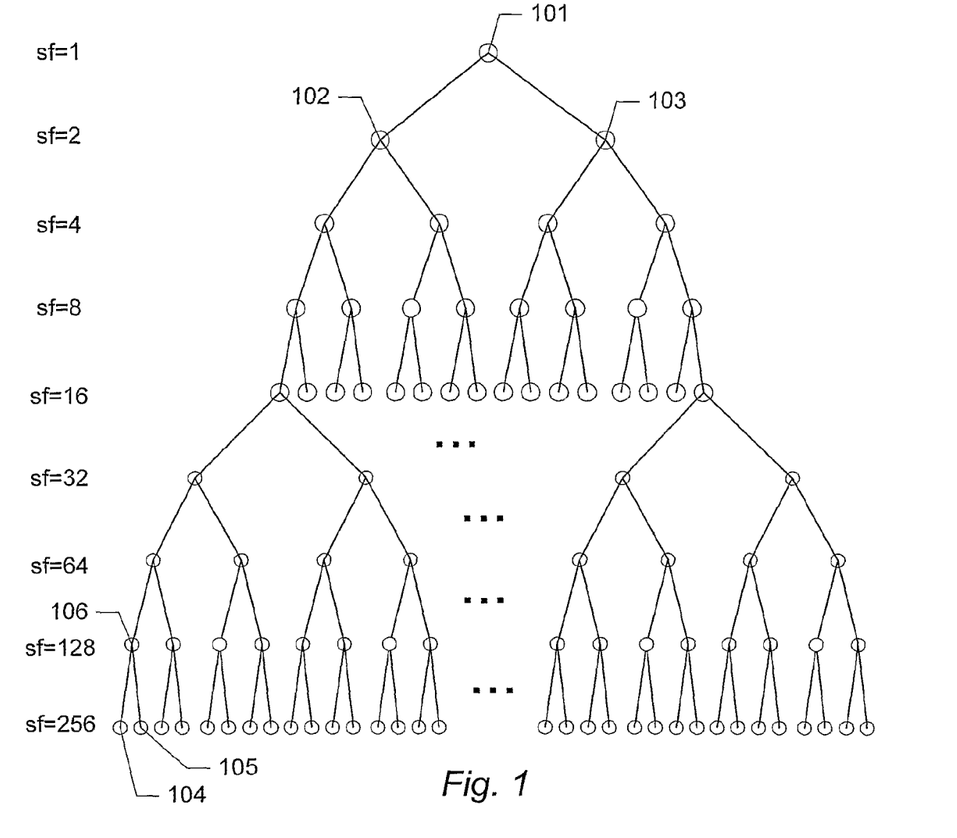
FIG. 1 illustrates the code tree of an embodiment of channelization codes used in a WCDMA system.

FIG. 1 illustrates the code tree of an embodiment of channelization codes used in a WCDMA system. An example of such a system is the 3GPP WCDMA system specified by the 3$^{rd}$ Generation Partnership Project (3GPP). A more detailed description of an example of the 3GPP WCDMA system can be found in the specification of the September 2004 release of 3GPP Release 5 published by the 3$^{rd}$ Generation Partnership Project (3GPP) and available on the Internet on www.3gpp.org. In particular, the channel structure of this example of a WCDMA system is described in 3GPP TS 25.211 (http://www.3gpp.org/ftp/Specs/2004-09/Rel-5/25_series/25211-560.zip). The multiplexing and channel coding of this example is described in 3GPP TS 25.212 (http://www.3gpp.org/ftp/Specs/2004-09/Rel-5/25_series/25212-590.zip). The spreading and modulation of this example is described in 3GPP TS 25.213 (http://www.3gpp.org/ftp/Specs/2004-09/Rel-5/25_series/25213-550.zip). The physical layer procedures of this example are described in 3GPP TS 25.214 (http://www.3gpp.org/ftp/Specs/2004-09/Rel-5/25_series/25214-590.zip). In the 3GPP WCDMA system each physical channel has assigned to it a channelization code of a set of orthogonal variable spreading factor codes, i.e. orthogonal codes with different spreading factor. An example of this type of code is the so-called Walsh set. Walsh functions can be recursively generated using a Hadamard matrix. Starting with $H_1=1$, the Hadamard matrix $H_{2s}$ can be constructed from the matrix $H_s$, according to $$H_{2s} = \begin{pmatrix} H_s & H_s \\ H_s & -H_s \end{pmatrix}, \text{i.e.}$$

$$H_2 = \begin{pmatrix} 1 & 1 \\ 1 & -1 \end{pmatrix}, \quad H_4 = \begin{pmatrix} 1 & 1 & 1 & 1 \\ 1 & -1 & 1 & -1 \\ 1 & 1 & -1 & -1 \\ 1 & -1 & -1 & 1 \end{pmatrix}, \text{etc.}$$

The rows of the corresponding matrix correspond to Walsh-Hadamard codewords. For the purpose of the present descriptions the codewords are denoted $c_{sf,n}$, where sf denotes the spreading factor level, and $0 \leq n \leq sf-1$. For example, the Walsh-Hadamard codeword $c_{sf,n}$ corresponds to the n-th row of the matrix $H_{sf}$. For example, the codewords of spreading factor sf=4 are the rows of $H_4$ above, i.e. $c_{4,0}=(1, 1, 1, 1)$, $c_{4,1}=(1, -1, 1, -1)$, $c_{4,2}=(1, 1, -1, -1)$, and $c_{4,3}=(1, -1, -1, 1)$. In FIG. 1, the hierarchy of codewords is illustrated as a tree structure, in which each node in the tree corresponds to a codeword $c_{sf,n}$. The root of the tree 101 corresponds to the code $c_{1,1}=1$. Each node is the root of a sub-tree and has two-subnodes, a so-called top sub-node and a bottom sub-node. For example, in FIG. 1, the top sub-node of node 101 is designated 102 and the bottom sub-node of node 101 is designated 103. The top sub-node of a parent node is constructed by repeating the root-node twice, i.e. the top-subnode 102 of (1) is (1, 1). The bottom sub-node is constructed by concatenating its parent with the inverse of its parent, i.e. the bottom sub-node 103 of node 101 is (1, −1).

Depending on the mode of operation of a mobile terminal, different physical channels with their respective spreading codes are known by the terminal to be present. Examples of known spreading codes include the following:

In Idle Mode (Camping cell), at least spreading codes for the common pilot channel (CPICH), the primary common control physical channel (P-CCPCH), and the PICH are known. In Idle Mode (Not known cell) at least spreading codes for CPICH and P-CCPCH are known. In Connected Mode at least spreading codes for CPICH, P-CCPCH, PICH, and DPCH are known.

For example, in the 3GPP WCDMA system, the channelization code of CPICH is $c_{256,0}$ corresponding to node 104 in FIG. 1. and the data symbols transmitted over CPICH have a constant value $d_{CPICH}=(1+i)/\sqrt{2}$. Always present in a 3GPP WCDMA system is also the broadcast channel BCH sent on P-CCPCH. The channelization code of P-CCPCH is $c_{256,1}$ corresponding to node 105. However, the data transmitted over P-CCPCH is a priori unknown to the receiver. The data comprises a sequence of symbols $d_{P-CCPCH}=(\pm 1 \pm i)/\sqrt{2}$ (QPSK).

As mentioned above, depending on the mode of operation, other spreading codes of other physical channels are also known to the receiver as well. Depending on the nature of these channels, the symbols transmitted over them may be a priori known or unknown to the terminal, or they may be partially known. For example, on the DPCH channel, both data symbols and pilot symbols are transmitted. While the pilot symbols are known to the receiving terminal, the data symbols are a priori unknown.

Figure 2:
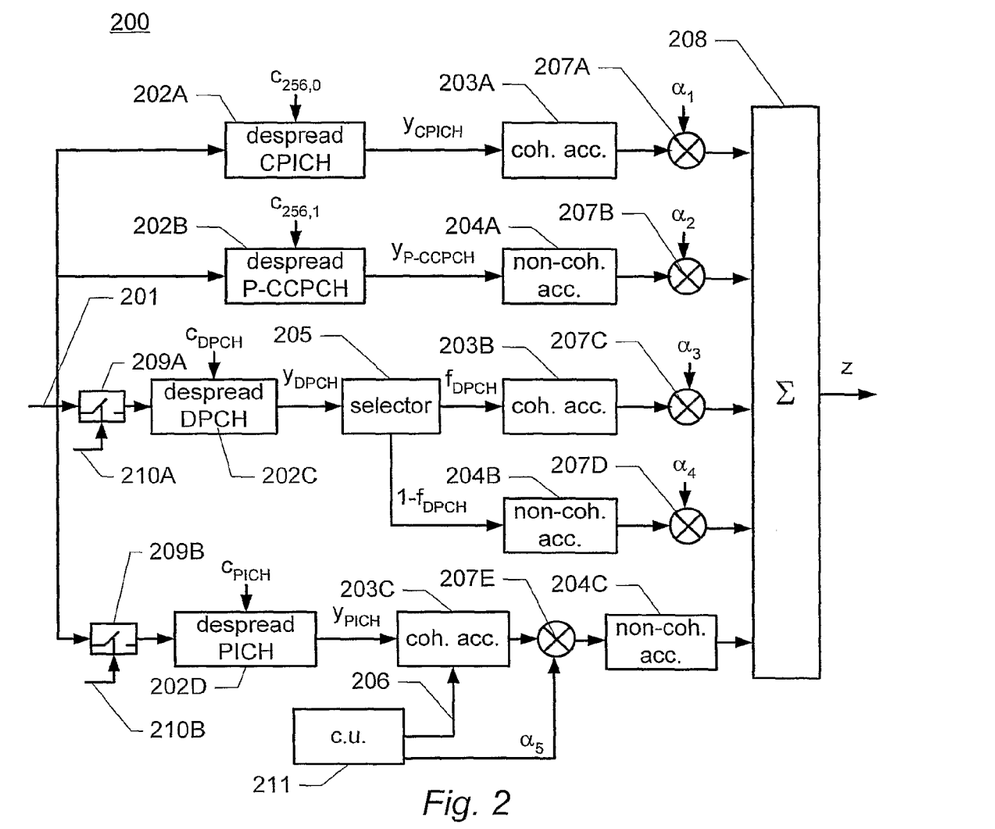
FIG. 2 shows a schematic block diagram of a calculation circuit for calculating a detection signal for detecting energy in a spread spectrum communications signal.

FIG. 2 shows a schematic block diagram of a calculation circuit for calculating a detection signal for detecting energy in a spread spectrum communications signal. The circuit, generally designated 200, receives a digital spread spectrum communications signal 201 e.g. from the radio receiver of a mobile terminal. The signal 201 is fed into a number of de-spreading circuits 202A, 202B, 202C, and 202D, each de-spreading the received signal 201 with a respective spreading code and resulting in de-spread signal symbols of respective physical channels. The signal symbols are fed into respective accumulators 203A, 203B, 203C, 204A, and 204B. For those physical channels for which the signal symbols are known a priori, the accumulation is performed coherently, while the accumulation is performed non-coherently for those physical channels for which the de-spread signal symbols are not known a priori. The accumulated signals are weighted by respective weighting factors in multipliers 207A, 207B, 207C, 207D, and 207E, respectively. The weighted accumulated signals are fed into a combiner 208 where they are combined to a single detection signal z. The detection signal z may be used in a synchronisation, tracking and/or searching circuit, e.g. a time tracking loop, a cells searching circuit, and/or the like. In particular, in some embodiments, the detection signal z is used for code matched filtering, e.g. for cell search or path search in a WCDMA receiver. In this case, the generation of z is repeated, or performed in parallel, for several delayed versions of the input signal 201. Alternatively, the spreading codes may be delayed relative to the input signal. Furthermore, during cell search, the signal z may be calculated for different scrambling codes corresponding to different candidate cells.

In the example of FIG. 2, the pilot channel CPICH is used for the generation of the detection signal. Furthermore, the additional channels P-CCPCH, DPCH and PICH are included for the purpose of generating the detection signal z.

Consequently, the circuit 200 comprises a de-spreader 202A that receives the communications signal 201 and the spreading code corresponding to CPICH. In embodiments of WCDMA, the CPICH has a fixed spreading code $c_{256,0}$. Hence, this spreading code is always known to the receiver. The de-spreader 202A thus generates de-spread symbols $y_{CPICH}(k)$ of the CPICH channel. Here $y_{CPICH}(k)$ denotes the de-spread symbol number k resulting from de-spreading with the spreading code for channel CPICH. For the purpose of this description, the symbols are assumed to be continuously enumerated. For a fixed chip rate, the symbol rate depends on the spreading factor used in de-spreading.

The de-spread symbols $y_{CPICH}(k)$ are fed into the accumulator 203A. The accumulator 203A coherently accumulates the de-spread symbols over a time corresponding to a predetermined number L of symbols. In the CPICH all symbols are equal. Hence, the coherent accumulation may be written as $$z_{CPICH}(m) = \left| \sum_{k=0}^{L-1} y_{CPICH}(mL+k) \right|^2. \quad (1)$$

The amount of coherent accumulation, i.e. the value of L, that can advantageously be performed by accumulator 203A depends on a number of parameters, including Doppler speed, frequency errors etc. In some embodiments, the accumulator 203A further accumulates consecutive values of $z_{CPICH}(m)$ non-coherently, according to $$z'_{CPICH}(n) = \sum_{m=0}^{M-1} z_{CPICH}(nM+m).$$

It is understood that alternative implementations of coherent accumulation may used. For example, instead of an accumulation over periodic intervals as in eqn. (1) above, the accumulation may be performed as a sliding average. Alternatively or additionally, instead of the calculation of the signal power of the accumulated signal as in eqn. (1), the amplitude of the accumulated signal may be calculated, according to $$z_{CPICH}(m) = \left| \sum_{k=0}^{L-1} y_{CPICH}(mL+k) \right|.$$

The accumulated signal $z_{CPICH}$ is then fed into a multiplier 207A where the accumulated signal is multiplied with a scaling factor $\alpha_1$. The resulting scaled accumulated signal is fed into combiner 208.

In WCDMA, the P-CCPCH also has a fixed channelization code, denoted $c_{256,1}$. Hence, the channelization code of P-CCPCH is also known at the receiver, and the communications signal after de-spreading with the channelization code $c_{256,1}$ can be used to detect energy in the signal. However, the data sent via P-CCPCH is not known by the receiver. Consequently, the de-spread symbols $y_{P-CCPCH}$ are accumulated non-coherently. Accordingly, the circuit 200 comprises a further de-spreader 202B that receives the signal 201 and the spreading code $c_{256,1}$ and that generates the de-spread symbols $y_{P-CCPCH}(k)$ as described in connection with the de-spreader 202A. The de-spread symbols $y_{P-CCPCH}(k)$ are fed into accumulator 204A that performs non-coherent accumulation over L symbols, according to $$z_{P-CCPCH}(m) = \left| \sum_{k=0}^{L-1} y_{P-CCPCH}(mL+k) \right|^2.$$

Hence, by calculating a function, e.g. the square, of the amplitude of each symbol and by summing over the squared amplitudes, the sum is independent of variations in the actual symbol, e.g. sign changes or changes of the phase of the symbols in the complex plane.

Since P-CCPCH uses spreading code $c_{256,1}$, the above contribution $z_{P-CCPCH}$ can always be added. As described in connection with the coherent accumulation, the non-coherent accumulation may likewise be performed in different ways, e.g. as a sliding average and/or as an accumulation of signal amplitudes rather than signal powers.

The accumulated signal $z_{P-CCPCH}$ is fed into multiplier 207B where it is multiplied with a scaling factor $\alpha_2$. The scaled accumulated signal is fed into combiner 208.

Depending on the mode of operation, the receiver also knows the channelization code of a DPCH, e.g. the code assigned to that receiver. Accordingly, when the channelization code of a DPCH is known, the DPCH can be utilised to capture additional energy in the received signal. To this end, the circuit 200 comprises a switch 209A that is controlled via a control signal 210A indicating whether a channelization code of a DPCH is known or unknown. If such a channelization code is available, the switch 209A is closed and the received communications signal 201 is fed into de-spreader 202C that de-spreads the signal 201 by applying the known channelization code $c_{DPCH}$ of the corresponding DPCH. The symbols transmitted over the DPCH include pilot symbols and data symbols. While the pilot symbols are known to the receiver and can be accumulated coherently, the data symbols need to be treated as unknown and are accumulated non-coherently. Consequently, the circuit 200 comprises a coherent accumulator 203B and a non-coherent accumulator 204B, each receiving a subset of the de-spread symbols $y_{DPCH}$ of the DPCH channel. To this end, the circuit 200 further comprises a selector circuit 205 that receives the de-spread symbols $y_{DPCH}$ and sends the known (e.g. pilot) symbols into the coherent accumulator 203B and the unknown (e.g. data) symbols into the non-coherent accumulator 204B. Hence, the operation performed by the selector 205 may be expressed by the following function:

$$f_{DPCH}(k) = \begin{cases} 1 & \text{if symbol with index } k \text{ is a known symbol;} \\ 0 & \text{otherwise} \end{cases},$$

Accordingly, the coherent accumulator 203B performs the following coherent accumulation of known DPCH symbols:

$$z_{DPCH,c}(m) = \left| \sum_{k=0}^{L\frac{256}{sf_{DPCH}}-1} f_{DPCH}\left(mL\frac{256}{sf_{DPCH}}+k\right) \cdot y_{DPCH}\left(mL\frac{256}{sf_{DPCH}}+k\right) \right|^2.$$

Here, the ratio $256/sf_{DPCH}$ of the spreading factor $sf_{CPICH}=256$ of CPICH to the spreading factor $sf_{DPCH}$ is introduced, in order to account for different spreading factors of the different contributions to be combined in combiner 208. Hence, DPCH channels with spreading factors equal to the spreading factor of CPICH, e.g. 256, as well as DPCH channels with spreading factors different from the spreading factor of the CPICH can be utilised for the detection of signal energy. For example, the spreading factor $sf_{DPCH}$ of the DPCH channel may be 4, 8, 16, or higher. By capturing signal energy related to physical channels of different spreading factors, i.e. different symbol lengths, the detection performance may be further improved.

The accumulated signal $z_{DPCH,c}$ is then fed into a multiplier 207C where the accumulated signal is multiplied with a scaling factor $\alpha_3$. The resulting scaled accumulated signal is fed into combiner 208.

The non-coherent accumulator 204B generates the corresponding non-coherently accumulated signal $$z_{DPCH,nc}(m) = \sum_{k=0}^{L\frac{256}{sf_{DPCH}}-1} \left|\left(1 - f_{DPCH}\left(mL\frac{256}{sf_{DPCH}} + k\right)\right) \cdot y_{DPCH}\left(mL\frac{256}{sf_{DPCH}} + k\right)\right|^2$$

The accumulated signal $z_{DPCH,c}$ is then fed into a multiplier 207D where the accumulated signal is multiplied with a scaling factor $\alpha_4$. The resulting scaled accumulated signal is fed into combiner 208.

Depending on the mode of operation, the channelization code of a PICH channel is also known to the receiver. Accordingly, when the channelization code of a PICH is known, e.g. when the receiving terminal is camping on a cell, the PICH can be utilised to capture additional energy in the received signal. Accordingly, the circuit 200 comprises a switch 209B that is controlled via a control signal 210B indicating whether a channelization code of a PICH is known. If such a channelization code is available, the switch 290B is closed and the received communications signal 201 is fed into de-spreader 202D that de-spreads the signal 201 by applying the known channelization code $c_{PICH}$ of the corresponding PICH resulting in de-spread symbols $y_{PICH}$. The symbols transmitted over the PICH are a priori unknown. However, since the transmitted symbols are repetition coded within so-called paging groups (PG), the symbols are known to be unchanged via predetermined time intervals.

It should be noted that, in alternative embodiments, alternative or additional channels may be used for the purpose of detecting energy in the signal. For example, in future implementations the CPICH and the P-CCPCH may not always be present together. In one alternative embodiment, only CPICH and DPCH are used for the detection of energy in the signal, e.g. in a system with a high-power DPCH and a low-power P-CCPCH.

Figure 3:
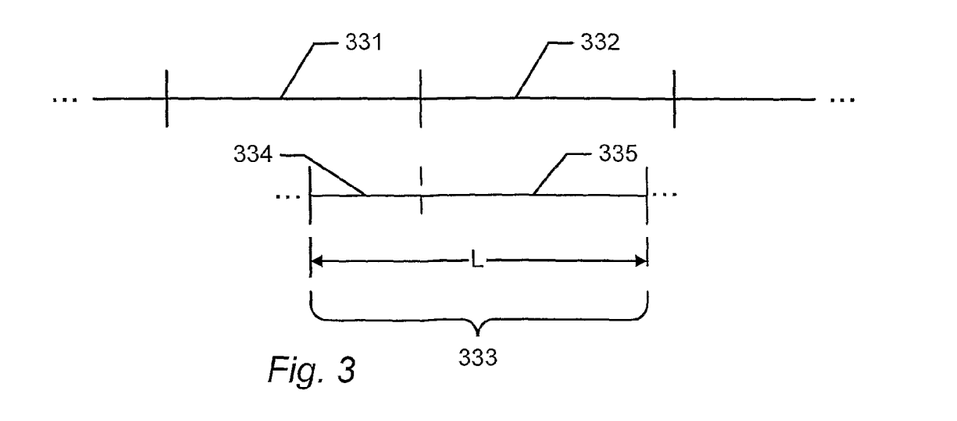
FIG. 3 illustrates the accumulation of symbols received via a page indicator channel.

FIG. 3 illustrates the accumulation of symbols received via a page indicator channel. The symbols on a page indicator channel (PICH) are transmitted in time intervals referred to as paging groups. In FIG. 3, two consecutive paging groups are shown and designated 331 and 332, respectively. Within each of the paging groups 331 and 332, the transmitted symbols are the same, but the symbols differ from paging group to paging group. FIG. 3 further illustrates an accumulation interval 333 of the accumulations performed by the circuit of FIG. 2. The accumulation interval 333 has a length of L symbols. In the example of FIG. 3, a situation is shown where the accumulation interval 333 is not synchronised with the paging groups 331 and 332, i.e. the beginning and end of the accumulation interval does not coincide with the beginning/end of a paging group. However, since the symbols in each of the sub-intervals 334 and 335 of the accumulation interval 333 that overlap with respective paging groups are known to be constant, coherent accumulation over each of the sub-intervals 334 and 335 can be performed. The resulting coherently accumulated signals can then be combined non-coherently as to obtain a total accumulated signal for the accumulation interval L.

Again referring to FIG. 2, the circuit 200 exploits the properties of the PICH by the coherent accumulator 203C that receives the de-spread symbols $y_{PICH}$ and performs coherent accumulation over time intervals that fall entirely within a paging group. The accumulated signal is fed into multiplier 207E which multiplies the accumulated signal by a scaling factor $\alpha_5$. The scaled signal is then fed into a non-coherent accumulator 204C where contributions from different paging groups are non-coherently combined. The resulting signal is fed into combiner 208. The output of accumulator 204C may be expressed as $$z_{PICH}(m) = \sum_{k \in \{k | PK_k \text{ overlaps accumulation interval}\}} \left(\alpha_5(PG_k) \left|\sum_{l=l_{start}}^{l_{end}} y_{PICH}(l)\right|^2\right),$$

where $I_{start}$ and $I_{end}$ illustrate the intervals of coherent accumulation with a paging group $PG_k$, and where $\alpha_5(PG_K)$ is the scaling factor for the paging group $PG_K$.

Accordingly, the circuit 200 further comprises a control unit 211 that controls the coherent accumulator 203C, e.g. by feeding a timing signal 206 to the accumulator indicative of the start and end of a paging group. Furthermore, the control circuit 211 generates the weighting factor $\alpha_5(PG_K)$ as a function of the accumulated symbols within the paging group $PG_K$. An embodiment of the selection of weighting factors will be described in greater detail below.

The combiner 208 receives the above contributions to a detection signal and generates a single detection signal according to $z(m) = \alpha_1 \cdot z_{CPICH}(m) + \alpha_2 \cdot z_{P\text{-}CCPCH}(m) + \alpha_3 \cdot z_{DPCH,c}(m) + \alpha_4 \cdot z_{DPCH,nc}(m) + z_{PICH}(m).$ In some embodiments further non-coherent accumulation of z(m) is performed, thereby improving the correlation results. The weighting/scale factors $\alpha_i$, i=1, ..., 5, allow a relative weighting of the individual contributions fed into the combiner 208. In one embodiment, the weighting factors are selected as to obtain a maximum ratio combining (MRC) by the addition of the terms. In such an embodiment, the weighting factor for a term accounts for how much noise suppression is achieved with a certain spreading factor (sf) and a certain amount of coherent accumulation.

In particular, in one embodiment, the weighting factors $\alpha_i$, i=1, ..., 5, in FIG. 2 are selected as follows as to maximize the SIR of the received signal:

$\alpha_1 = L$ $\alpha_2 = 1$ $\alpha_3 = \frac{sf_{DPCH}}{256} \cdot \text{"number of known symbols accumulated"}$ $\alpha_4 = \frac{sf_{DPCH}}{256}$ $\alpha_5(PG_k) = \text{"number of known symbols accumulated in } PG_k\text{"}.$ Hence, the weighting factors are selected as the number of coherently accumulated symbols multiplied by a relative length of the accumulated symbols. In another embodiment the weighting factors are selected based on one or several estimated channel SNRs. In this embodiment extra accumulations can be added when needed. In one embodiment, extra accumulations are added when needed and conditioned on whether they actually contribute.

In yet further embodiments, the weighting factors are determined adaptively, e.g. by adaptively tuning the weighting factors as to maximize the detection performance. Alternatively, the weighting factors may be selected manually.

In the embodiment described above, the accumulation intervals for each of the channels are the same, i.e. they have the same length and are mutually synchronised. However, it is understood that, in alternative embodiments, different accumulation intervals may be used for different channels, including accumulation intervals of different lengths. In some embodiments, different accumulation intervals may be preferred due to timing issues. The extra accumulations above will need some more de-spreading hardware.

Since the detection signal z is generated based on a plurality of channels, more signal energy is captured in the accumulation of the detection signal z and, therefore, the detection performance of the generated detection signal z is increased. Furthermore, since the accumulation is performed coherently in the case of known symbols, the detection performance is improved. Furthermore, since channels with unknown signal symbols are also utilised for the generation of the detection signal, the detection performance is improved.

In the above example, the channels P-CCPCH, DPCH, and PICH are used together with CPICH. It is understood, however, that alternative and/or additional channels may be used, if their spreading codes are known to the terminal. In particular, as mentioned above, depending on the mode of operation of the mobile terminal, different spreading codes may be known. Depending on the channel, the symbols—or at least some of the symbols—communicated via that channel are known or are at least known to be unchanged over a predetermined period of time. For the known symbols, coherent accumulation can be performed, while the remaining symbols are accumulated non-coherently.

Furthermore, in some applications, the actual selection of which channels to include in the calculation of the detection signal may depend on a trade-off between an increase in complexity and an increase in detection performance.

Figure 4:
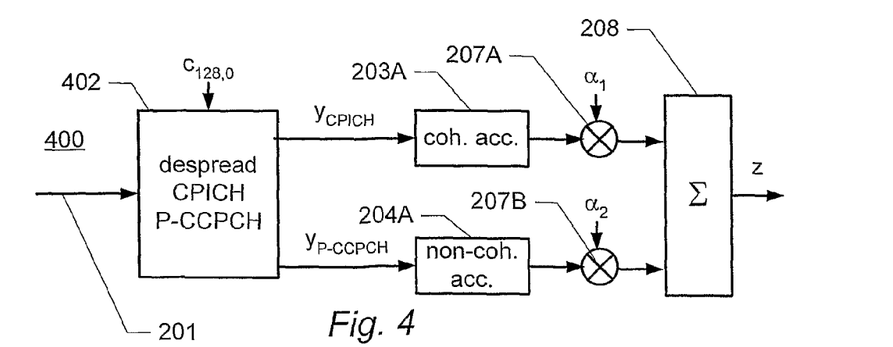
FIG. 4 shows a schematic block diagram of another embodiment of a calculation circuit for calculating a detection signal for detecting energy in a spread spectrum communications signal.

FIG. 4 shows a schematic block diagram of another embodiment of a calculation circuit for calculating a detection signal for detecting energy in a spread spectrum communications signal. The circuit, generally designated 400, receives a digital spread spectrum communications signal 201 e.g. from the radio receiver of a mobile terminal. The signal 201 is fed into a de-spreading circuit 402 for de-spreading the received signal 201 and resulting in de-spread signal symbols of two physical channels, namely CPICH and P-CCPCH, that have a common spreading factor. The signal symbols are fed into respective accumulators 203A, and 204A as described in connection with FIG. 2. The accumulator 203A performs coherent accumulation over the CPICH symbols, while the accumulator 204A performs non-coherent accumulation over the P-CCPCH symbols. The resulting accumulated signals are multiplied with respective weighting factors $\alpha_1$ and $\alpha_2$ by multipliers 207A and 207B, respectively, and fed into the combiner 208 as described in connection with FIG. 2. Hence, the accumulation of the CPICH and P-CCPCH symbols are performed as in the circuit described in connection with FIG. 2, and will not be described again here. However, in the embodiment of FIG. 4 the de-spreading of the CPICH and P-CCPCH channels is performed by a combined de-spreader 402 rather than by two separate de-spreaders as in FIG. 2. Consequently, a particularly efficient circuitry is provided that requires few resources for the calculation of the detection signal. The embodiment of FIG. 4 only performs accumulation of the CPICH and P-CCPCH. It is understood, however, that further de-spreading with additional spreading codes and corresponding accumulation of symbols from other physical channels may be added, e.g. as described in connection with FIG. 2. An embodiment of the combined de-spreader 402 will now be described with reference to FIG. 5.

Figure 5:
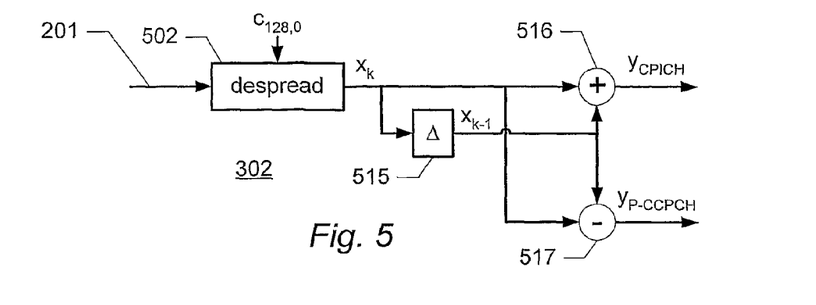
FIG. 5 shows a schematic block diagram of a combined de-spreader for the CPICH and P-CCPCH physical channels of a 3GPP WCDMA system.

FIG. 5 shows a schematic block diagram of a combined de-spreader for the CPICH and P-CCPCH physical channels of a 3GPP WCDMA system. As described above, the sequence of transmitted symbols $d_{CPICH}$ over the CPICH channel are known. In particular, in an embodiment of the 3GPP WCDMA system, the symbols have the constant value $d_{CPICH}=(1+i)/\sqrt{2}$. The sequence of P-CCPCH symbols $d_{P\text{-}CCPCH}$ however is unknown. In an embodiment of the 3GPP WCDMA system the symbols $d_{P\text{-}CCPCH}$ have the values $(\pm1\pm i)/\sqrt{2}$. Both channels have the same spreading factor (sf=256), the CPICH has channelization code $c_{PICH}=c_{256,0}=(1, 1, \ldots, 1)$, i.e. a 256-tuple comprising all "1", and the P-CCPCH has channelization code $c_{P\text{-}CCPCH}=c_{256,1}=(1, \ldots, 1, -1, \ldots, -1)$, i.e. a 256-tuple comprising a sequence of 128 "1's" followed by a sequence of 128 "-1's".

The combined de-spreader 402 comprises a de-spreader 502 that receives the incoming signal 201 and de-spreads it with a spreading factor sf=128, i.e. half the spreading factor of the channels CPICH and P-CPPCH. In particular, the de-spreader 502 applies a spreading code $c_{128,0}=(1, \ldots, 1)$, i.e. a sequence of 128 "1's". This code is designated 106 in the code tree of FIG. 1. The de-spreader 502 outputs the resulting sequence of complex symbols $x_k$. The sequence $x_k$ is fed into a delay circuit 515, an adder 516, and a subtraction circuit 517. The delay circuit delays the sequence $x_k$ by one symbol, i.e. the output of the delay circuit corresponds to the sequence $x_{k-1}$. The delayed sequence $x_{k-1}$ is also fed into the adder 516 and the subtraction circuit 517. Hence, the adder 516 outputs the sequence $x_{k-1}+x_k$ while the subtraction circuit outputs the sequence $x_{k-1}-x_k$. Since $c_{128,0}$ corresponds to the parent node of codes $c_{256,0}$ and $c_{256,1}$ in the code tree of FIG. 1, the codes are related according to $c_{256,0}=(c_{128,0}, c_{128,0})$ and $c_{256,1}=(c_{128,0}, -c_{128,0})$. Hence the outputs of the adder 516 and subtraction circuit 517 correspond to the de-spread symbols of CPICH and P-CCPCH, respectively: $y_{CPICH}(k)=x_{k-1}+x_k$, and $y_{P\text{-}CCPCH}(k)=x_{k-1}-x_k$.

As described above, coherent accumulation may be used when the transmitted symbols are known, e.g. as in the case of pilot symbols. Coherent accumulation over a predetermined accumulation interval may also be employed if the transmitted symbols are known to be the same during the accumulation interval, while the exact value of the symbols may be unknown, as was described above in connection with the example of PICH symbols that are unchanged during a paging group. In the following, with reference to the DPCH channel of an embodiment of 3GPP WCDMA, an embodiment of a calculation circuit for calculating a detection signal will be described that allows performing coherent accumulation also for data channels where the data symbols are a priori unknown.

Figure 6:
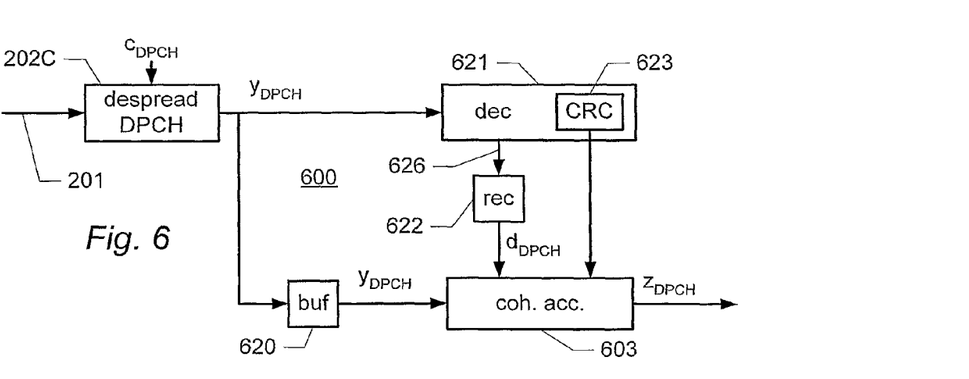
FIG. 6 shows a schematic block diagram of yet another embodiment of a calculation circuit for calculating a detection signal for detecting energy in a spread spectrum communications signal.

FIG. 6 shows a schematic block diagram of yet another embodiment of a calculation circuit, generally designated 600, for calculating a detection signal for detecting energy in a spread spectrum communications signal. When receiving the communications signal 201, the data symbols on a DPCH are a priori unknown. Hence, the de-spread data symbols generated by the de-spreader 202C by applying the spreading code $c_{DPCH}$ are unknown. However, after a corresponding block of the received signal has been received, e.g. after each transmission time interval (TTI), and decoded successfully by a subsequent decoder 621, all transmitted data symbols $d_{DPCH}$ of the corresponding block can be reconstructed by re-formatting the block as it was done by the transmitter. The decoder 621 generates decoded data 626. The decoder 621 further includes an error detection function 623, e.g. a cyclic redundancy check (CRC) function, resulting in a check value that indicates whether the decoding has been performed successfully. The circuit 600 further comprises a reconstruction circuit 622 that reconstructs the values $d_{DPCH}$ of the signal symbols transmitted by the transmitter. In particular, the circuit 622 receives the decoded data 626 and performs the operations that the transmitter has performed prior to transmitting the signal in order to generate the signal symbols from the source data. Typically, these operations include channel encoding, interleaving, modulation, etc.

The circuit 600 further comprises a buffer 620 that receives the de-spread symbols $y_{DPCH}$ from the de-spreader 202C, and that buffers a predetermined number of symbols, e.g. the symbols corresponding to one block of symbols, i.e. one TTI. When a complete block of symbols has been received and buffered in the buffer 620, the buffer forwards the buffered symbols $y_{DPCH}$ to a coherent accumulator 603. The accumulator 603 further receives the reconstructed data symbols $d_{DPCH}$ from the reconstruction circuit 622, and a CRC value from the decoder 621. Since the values of the de-spread symbols are given by the reconstructed symbols $d_{DPCH}$, i.e. known, they can be coherently accumulated by the accumulator 603, resulting in a coherently accumulated detection signal $z_{DPCH}$.

If the CRC value indicates an unsuccessful decoding of the received symbols, the corresponding de-spread signal symbols $y_{DPCH}$ are discarded by the coherent accumulator 603.

In one embodiment, the calculation circuit of FIG. 6 is applied to one or more channels with unknown symbols while direct coherent accumulation is applied to one or more channels with known symbols, e.g. by combining different partial detection signals as described in connection with FIG. 2.

In another embodiment, the circuit further comprises a non-coherent accumulator (not explicitly shown) and the CRC value is used to control a switch function that selectively forwards the buffered de-spread symbols from the buffer 620 to either the coherent accumulator 603 or the additional non-coherent accumulator.

In yet another embodiment, instead of buffering the de-spread symbols $y_{DPCH}$, the raw chip values are buffered. In a situation where the detection signal is to be used for the purpose of a code matched filter, the amount of buffering is smaller when raw chips are buffered.

In FIG. 6, the detection signal is calculated on the basis of DPCH only. However, it is understood that, in alternative embodiments, the coherent accumulation of buffered DPCH symbols may be combined with accumulation of one or more other physical channels as described herein. Such a combination may further involve a scaling of $z_{DPCH}$ as described above. In particular, in an embodiment using the coherent accumulation of buffered symbols as in FIG. 6, the scaling factor may be determined based on the CRC value as to correspond to the number of coherently accumulated symbols.

The embodiment of FIG. 6 provides a particularly exact estimate for high power channels, e.g. a high bit-rate DPCH. Furthermore, the spreading factor for high rate channels is generally small, thereby yielding many symbols per unit time. Consequently, the accumulation can be performed over many symbols per unit time.

This embodiment may advantageously be applied for the purpose of tracking slowly varying processes, such as path searching, where the additional delay due to the buffering does not have a significant effect on the overall performance.

Figure 7:
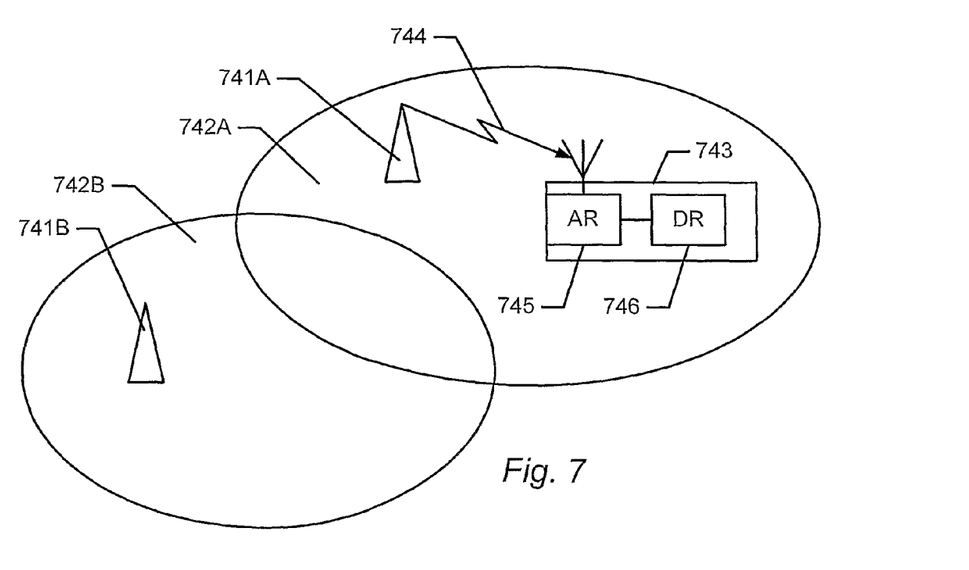
FIG. 7 illustrates a schematic overview of a WCDMA communications system.

FIG. 7 illustrates a schematic overview of a WCDMA communications system. The communications system comprises a number of base stations. In FIG. 7 two base stations 741A and 741B are shown. Each base station is related to a given cell of the communication system, as illustrated by areas 742A and 742B in FIG. 7. The system further comprises a number of user terminals. In FIG. 7 only one such terminal 743 is shown. The terminal 743 receives radio-frequency (RF) communications signals from one or more of the base stations 741A and 741B, as exemplified in FIG. 7 by communications signal 744. The user terminal 743 comprises an analogue receiver block 745 that receives the RF signal 744 from the base station 741A and generates a digital communications signal. Typical analogue receivers include one or more of the following functions: amplification, down-conversion from RF to IF, band-pass filtering, gain control, and A/D conversion. The digital signal generated by block 745 is then fed to a digital receiver block 746 that performs digital signal processing steps including de-spreading, de-modulation, cell search, delay tracking, data decoding etc. In particular, an embodiment of the digital receiver block comprises circuitry for detecting energy in the received signal as described herein.

Although some embodiments have been described and shown in detail, the invention is not restricted to them, but may also be embodied in other ways within the scope of the subject matter defined in the following claims.

The invention can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of generating a detection signal for detecting energy in a received spread spectrum communications signal, the method comprising:
   de-spreading a received spread spectrum communications signal by applying at least one predetermined spreading code from a set of spreading codes to obtain a sequence of de-spread signal symbols;
   obtaining at least a first and a second subset of said de-spread symbols, wherein the de-spread signal symbols of the first subset have values that are either known to the receiver or at least known to be the same for all de-spread signal symbols of the first subset, and wherein the de-spread signal symbols of the second subset have values unknown to the receiver;
   coherently accumulating the de-spread signal symbols of the first subset to obtain a first partial detection signal;
   accumulating a predetermined number of said de-spread signal symbols to obtain a first detection signal;

buffering at least one of the received spread spectrum signal and the sequence of de-spread signal symbols as a buffered signal;

decoding a predetermined block of the de-spread signal symbols to obtain a set of decoded data;

processing the decoded data to reconstruct a corresponding block of transmitted signal symbols;

performing the steps of buffering, decoding, processing the decoded data, and generating a coherently accumulated detection signal with respect to the second subset of de-spread data symbols to obtain a second partial detection signal;

combining the first and second partial detection signals to obtain a single detection signal; and generating a coherently accumulated detection signal from the buffered signal and the reconstructed transmitted signal symbols.

2. The method according to claim 1, further comprising the steps of:

verifying the decoding step; and performing the step of generating the coherently accumulated detection signal conditioned on a successful verification.

3. The method according to claim 2, wherein the verifying step further comprises the step of performing a cyclic redundancy check.

4. The method according to claim 1, wherein de-spreading comprises de-spreading with at least a first and a second spreading code to obtain corresponding first and a second sequences of de-spread signal symbols; and wherein obtaining at least a first and a second subset of said de-spread signal symbols comprises obtaining each of the first and second subset from one of the first and second sequences.

5. The method according to claim 4, wherein the first and second spreading codes have a first spreading factor; and wherein the method further comprises the steps of:

de-spreading the received spread spectrum communications signal by applying an auxiliary spreading code, the auxiliary spreading code having a second spreading factor equal to half the first spreading factor, to obtain a sequence of auxiliary de-spread signal symbols; and generating first and second sequences of de-spread signal symbols corresponding to respective ones of the first and second spreading codes by pairwise combining the auxiliary de-spread signal symbols.

6. The method according to claim 5, wherein the first spreading code comprises a sequence of 2n identical values, n being a positive integer, while the second spreading code comprises a first part sequence of n identical values and a second part sequence of n identical values having an opposite sign than the values of the first part sequence; and wherein the auxiliary spreading code comprises a sequence of n identical values.

7. A method according to claim 1, wherein the at least one predetermined spreading code includes a spreading code of a common pilot channel (CPICH), and wherein the first subset of de-spread signal symbols comprises signal symbols received over the common pilot channel.

8. The method according to claim 1, wherein the at least one predetermined spreading code includes a spreading code of a primary common control physical channel (P-CCPCH), and wherein the second subset of de-spread signal symbols comprises signal symbols received over the primary common control physical channel (P-CCPCH).

9. The method according to claim 8, wherein the at least one predetermined spreading code includes a spreading code of a page indicator channel (PICH), and wherein the first subset of de-spread signal symbols comprises signal symbols received over the page indicator channel.

10. The method according to claim 1, wherein the at least one predetermined spreading code includes a spreading code of a dedicated physical channel (DPCH); wherein the first subset of de-spread signal symbols comprises known signal symbols received over the dedicated physical channel; and wherein the second subset of de-spread signal symbols comprises unknown signal symbols received over the dedicated physical channel.

11. The method according claim 10, wherein combining the first and second partial detection signals comprises multiplying at least one of the first and second partial detection signals with a weighting factor.

12. A method according to claim 11, wherein multiplying comprises multiplying at least one of the first and second partial detection signals with a weighting factor to obtain a maximum ratio combining of the first and second partial detection signals.

13. The method according to claim 12, wherein the de-spread signal symbols of the first subset have a value that remains constant over a predetermined number of symbols; and wherein coherently accumulating the de-spread signal symbols of the first subset comprises coherently accumulating the de-spread signal symbols of the first subset over said predetermined number of symbols.

14. The method according to claim 1, wherein the at least one predetermined spreading code includes a spreading code of a dedicated physical channel (DPCH).

15. The method according to claim 1, wherein the set of spreading codes is a set of orthogonal varying spreading factor codes.

16. The method according to claim 1, wherein the set of spreading codes is a set of channelization codes of a telecommunications system.

17. The method according to claim 16, wherein the communications system is a CDMA communications system.

18. A method of generating a detection signal for detecting energy in a spread spectrum communications signal received by a receiver, the method comprising the steps of:

de-spreading a received spread spectrum communications signal by applying at least one predetermined spreading code from a set of spreading codes to obtain a sequence of de-spread signal symbols;

accumulating a predetermined number of said de-spread signal symbols to obtain a single detection signal, wherein the accumulating step includes:

obtaining at least a first and a second subset of said de-spread signal symbols, wherein the de-spread signal symbols of the first subset have values that are either known to the receiver or at least known to be the same for all de-spread signal symbols of the first subset, and wherein the de-spread signal symbols of the second subset have values unknown to the receiver;

coherently accumulating the de-spread signal symbols of the first subset to obtain a first partial detection signal;

non-coherently accumulating the de-spread signal symbols of the second subset to obtain a second partial detection signal; and combining the first and second partial detection signals to obtain the single detection signal.

19. A receiver for receiving a spread spectrum communications signal, the receiver comprising:

at least one de-spreader adapted to de-spread a received spread spectrum communications signal by applying at least one predetermined spreading code from a set of spreading codes to obtain a sequence of de-spread signal symbols;

at least one accumulator for accumulating a predetermined number of said de-spread signal symbols to obtain a detection signal;

wherein the at least one accumulator includes
- a coherent accumulator for coherently accumulating the de-spread signal symbols of at least a first subset of said de-spread signal symbols to obtain a first partial detection signal, wherein the de-spread signal symbols of the first subset have values that are either known to the receiver or at least known to be the same for all de-spread signal symbols of the first subset;
- a non-coherent accumulator for non-coherently accumulating the de-spread signal symbols of at least a second subset of de-spread signal symbols having values unknown to the receiver to obtain a second partial detection signal; and
- a combiner for combining the first and second partial detection signals to obtain the single detection signal.

20. The receiver according to claim 19, wherein the at least one de-spreader is adapted to de-spread the received spread spectrum communications signal with respective first and second spreading codes to obtain respective first and second sequences of de-spread signal symbols; and wherein each of the first and second subsets of said de-spread signal symbols is a subset of a corresponding one of the first and second sequences of de-spread signal symbols.

21. The receiver according to claim 20, wherein the first and second spreading codes have a first spreading factor; wherein the de-spreader is adapted to de-spread the received spread spectrum communications signal by applying an auxiliary spreading code, the auxiliary spreading code having a second spreading factor equal to half the first spreading factor, to obtain a sequence of auxiliary de-spread signal symbols; and wherein the receiver comprises at least one combiner adapted to generate first and second sequences of de-spread signal symbols corresponding to respective ones of the first and second spreading codes by pairwise combining the auxiliary de-spread signal symbols.

22. The receiver according to claim 21, wherein the first spreading code comprises a sequence of 2n identical values, n being a positive integer, while the second spreading code comprises a first part sequence of n identical values and a second part sequence of n identical values having an opposite sign than the values of the first part sequence; and wherein the auxiliary spreading code comprises a sequence of n identical values.

* * * * *